United States Patent
Rohm

[15] 3,687,183
[45] Aug. 29, 1972

[54] SELF-LOCKING SCREW THREADED FASTENER

[72] Inventor: Robert F. Rohm, Fullerton, Calif.
[73] Assignee: Threadline Fastener Corporation, Covina, Calif.
[22] Filed: June 30, 1970
[21] Appl. No.: 51,215

[52] U.S. Cl. .................................. 151/22, 10/10 R
[51] Int. Cl. .......................... B21h 3/08, F16b 39/30
[58] Field of Search .....151/22, 21 B, 24, 7; 10/10 R, 10/27 R, 86 A, 86 R

[56] References Cited

UNITED STATES PATENTS

| | | | |
|---|---|---|---|
| 2,815,787 | 12/1951 | Podell | 151/7 |
| 3,169,761 | 2/1965 | Herrington | 151/24 X |
| 2,842,180 | 7/1958 | Brown et al. | 151/22 |
| 2,484,644 | 10/1949 | Poupitch | 151/22 |
| 3,196,918 | 7/1965 | Hampton | 151/22 |
| 3,227,198 | 1/1966 | Coyle | 151/7 |
| 3,269,443 | 8/1966 | Coyle | 151/7 |
| 2,371,365 | 3/1945 | Tomalis et al. | 151/22 X |
| 3,233,258 | 2/1966 | Nevschotz | 151/41.73 X |
| 3,520,344 | 7/1970 | Gabbey | 151/22 |

FOREIGN PATENTS OR APPLICATIONS

| | | | |
|---|---|---|---|
| 701,556 | 1/1965 | Canada | 151/22 |

*Primary Examiner*—Ramon S. Britts
*Attorney*—Paul A. Weilein

[57] ABSTRACT

A self-locking fastener in which a portion of less than 180° circumferential extent of the screw thread of the fastener is changed in pitch diameter to achieve an interference fit. If it is an external screw or male thread, it is increased in pitch diameter; but if it is an internal screw or female thread, it is decreased in pitch diameter. In both instances, the cross sectional width of the screw thread is increased at any given diameter, and the width of the crest of the screw thread is increased without change in the crest diameter of the screw thread. In addition, improved locking is obtained, particularly at relatively high temperatures, by constructing the portion as an insert of a metal having a coefficient of expansion which is substantially the same or higher than the material of the fastener.

7 Claims, 11 Drawing Figures

PATENTED AUG 29 1972

INVENTOR
ROBERT F. ROHM

BY
Paul A. Weilein
ATTORNEY

INVENTOR
ROBERT F. ROHM
BY
Paul A. Weilein
ATTORNEY

SELF-LOCKING SCREW THREADED FASTENER

BACKGROUND OF THE INVENTION

In view of the fact that self-locking screw fasteners with plastic inserts are not effective at elevated temperatures, a number of suggestions have been made for achieving self-locking action by interference between the screw thread of a fastener and the cooperative screw thread of a complementary member. One such suggestion is to distort the screw thread of the fastener; another suggestion is to make a local change in the pitch of the screw thread of the fastener; and another suggestion is to provide a local increase in the diameter of the screw thread.

For various reasons such self-locking fasteners have for the most part been found to be unsatisfactory for extensive use. In most instances the proposed constructions do not afford sufficient control over the self-locking action, on the one hand, to avoid galling and seizure and, on the other hand, to avoid inadequate locking action particularly at relatively high temperatures. In other instances the change in the configuration of a fastener to achieve the self-locking action results in excessive leakage along the screw thread in an installation where leakage is an important consideration. In many instances, too, the change in the configuration of the screw thread for the self-locking action causes the screw thread to gouge or otherwise damage the complementary thread of the complementary member. It has also been found that in most instances the self-locking action is destroyed or at least drastically reduced if any attempt is made to reuse the fastener.

SUMMARY OF THE INVENTION

In the screw fastener of the present invention the screw thread configuration is enlarged in a region of less circumferential extent than 180° to cause the self-locking action to occur across one diameter of the fastener, the enlargement causing a radial shift of the fastener relative to the complementary member. If the complementary member is a nut, the local enlargement tends to distort the nut to an elliptical configuration and since the minute yield is well within the elastic limits of the nut, the fastener may be used repeatedly without undue loss of its self-locking effectiveness.

The local enlargement of the cross sectional configuration in the case of the screw or male thread is achieved by local shift in the pitch diameter of the screw thread towards the crest diameter so that the pitch diameter of the enlarged male thread portion is greater than the pitch diameter of the rest of the threads. One important advantage of this concept is that the local enlargement of the screw thread need not and preferably does not increase the diameter of the crest of the screw thread. Thus, the axial profile of the fastener is not changed by the local enlargement of the screw thread of the fastener.

If the fastener has an external screw thread, the local pitch diameter of the screw thread is increased sufficiently for the desired interference fit. Thus, in the contemplated range of tolerances, the minimum pitch diameter of the enlarged portion of the screw thread is greater than the maximum pitch diameter of the complementary internal screw thread. On the other hand, if the fastener has an internal screw thread, the local pitch diameter of the screw thread is decreased sufficiently for the desired interference fit and in the contemplated range of tolerances, the maximum pitch diameter of the enlarged portion of the screw thread is less than the minimum pitch diameter of the complementary external screw thread.

An important feature of the preferred practices of the invention is that the cross sectional taper of the turns of the screw thread is not changed in the enlarged portion of the screw thread. In other words, the angle between the opposite slopes of the screw thread is not changed. By virtue of this fact, if the normal part of the screw thread makes extensive surface-to-surface contact with the complementary screw thread, the enlarged portion of the screw thread makes similar extensive surface-to-surface contact with the complementary screw thread.

One important advantage of this feature is that the extensive metal-to-metal contact between the two cooperating screw threads results in both relatively low unit stress and relatively high joint strength. Another advantage of special importance in many installations is that leakage along the thread in the self-locking zone is minimized.

A further primary advantage of the invention is the simple manner in which the local enlargement of the screw thread may be achieved and a related advantage is the close control that is afforded over the local enlargement of the configuration of the screw thread.

As for simplicity of fabrication, the entire screw thread of the fastener may be formed by using a cutting tool for single point turning of the screw thread and by simply slightly retracting the cutting tool in the region of the desired local enlargement of the screw thread. Thus, if an external screw thread is being turned, the cutting tool may be slightly retracted radially outwardly of the fastener in the region of the desired enlargement, and if an internal screw thread is being turned, the cutting tool may be slightly retracted radially inwardly of the fastener in the region of the desired enlargement. In either case, the degree of retraction of the cutting tool may be as closely controlled as may be desired.

In the presently preferred practice of the invention, the desired local enlargement of the cross sectional configuration of the screw thread is achieved by forming a recess in the fastener with consequent removal of a portion of the screw thread and by then seating in the recess a metal insert having thread formations that replace the removed thread portions, the thread formations of the insert differing from the removed thread portions in the respects theretofore mentioned, i.e., in having a different pitch diameter.

A further feature of this latter practice of the invention is the concept of employing a metal for the insert that differs in properties from the metal of the fastener. In this regard, and particularly in order to obtain improved locking at relatively high temperatures, an important concept is to use an insert metal that has a coefficient of expansion which will be the same or higher than that of the fastener material.

A further feature of the invention, in the case of a metal insert, is the concept of machining the insert to provide the enlarged screw thread formations thereon after the insert is installed in the recess of the fastener. Such a procedure simplifies the problem of controlling the degree to which the insert protrudes from the recess and also simplifies the problem of registering the screw thread formations of the insert with the interrupted turns of the screw thread of the fastener.

The features and advantages of the invention may be understood from the following detailed description together with the accompanying drawings.

DESCRIPTION OF THE PREFERRED EMBODIMENTS

Figure 1:
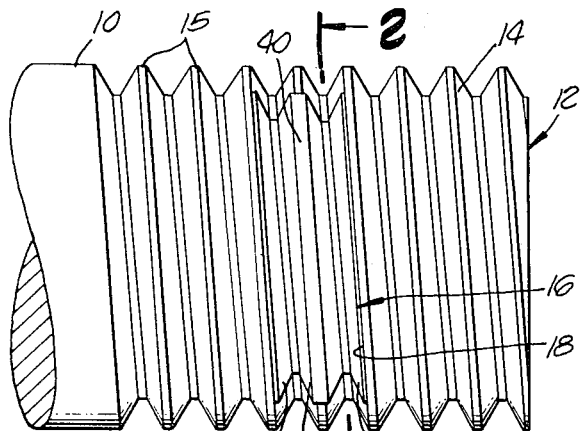
FIG. 1 is an elevational view of the threaded portion of a screw that embodies the invention.
Figure 2:
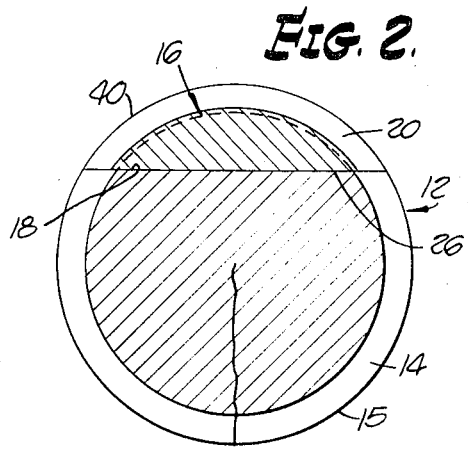
FIG. 2 is a transverse section taken as indicated by the line 2—2 of FIG. 1.
Figure 3:
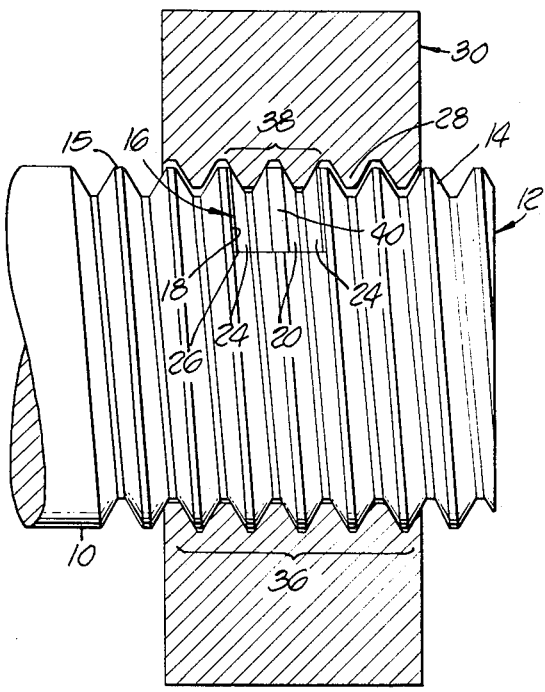
FIG. 3 is a view partly in section and partly in side elevation showing how the screw cooperates with the internal thread of a complementary member such as a nut.

Referring to the first embodiment of the invention shown in FIG. 1-3, FIG. 1 shows a portion of the smooth shank 10 of a screw that is generally designated 12, a screw thread 14 extending from the screw shank to the end of the screw. It is to be noted that the crest 15 of the screw thread is a continuation of the cylindrical surface of the shank 10. In accord with the teaching of the invention, a metal insert generally designated 16 is seated in a recess 18 of the screw and has outer screw thread formations that register with the portions of the screw thread 14 that are interrupted by the recess. In this instance the outer formation of the metal insert 16 comprises a central thread formation 20 that matches an interrupted turn of the screw thread 14 and two flanking thread formations 24, each of which is of a cross section less than the cross section of the screw thread 14 and each of which matches with a corresponding cross section of a corresponding turn of the screw thread 14.

As indicated in FIG. 2, the recess 18 is what may be termed a chordal recess in that the bottom wall 26 of the recess is planar and is in a plane that conforms to a chord of the circular cross sectional configuration of the screw. As may be seen in FIG. 1, the chordal recess 18 is inclined to conform to the helix angle of the screw and the width of the insert 16 is approximately the width of two turns of the screw thread 14, the insert extending in width from approximately the crest of one turn of the screw thread to approximately the crest of the turn that is twice removed from the one turn. It is apparent that the surface configuration of the insert is uniform along its circumferential extent.

Figure 9:
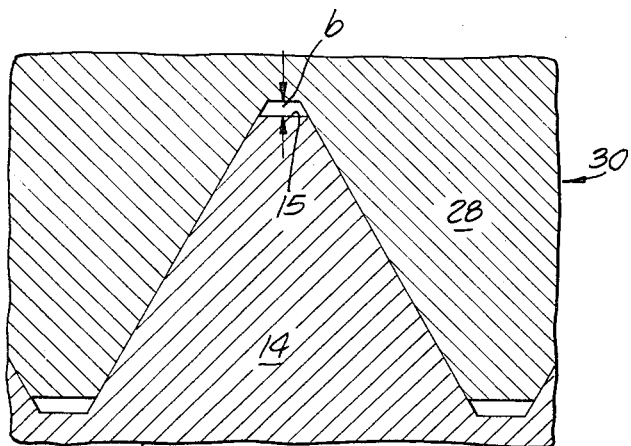
FIG. 9 is a diagrammatic sectional view showing how a conventional external screw thread cooperates with a conventional internal screw thread.
Figure 10:
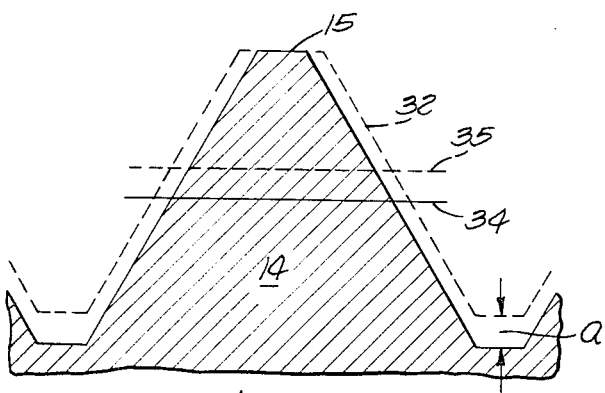
FIG. 10 is a diagrammatic view showing how a conventional screw thread compares in cross sectional configuration with that of a screw thread compares in cross sectional configuration with that of a screw thread portion that is enlarged in accord with the preferred practices of the invention.
Figure 11:
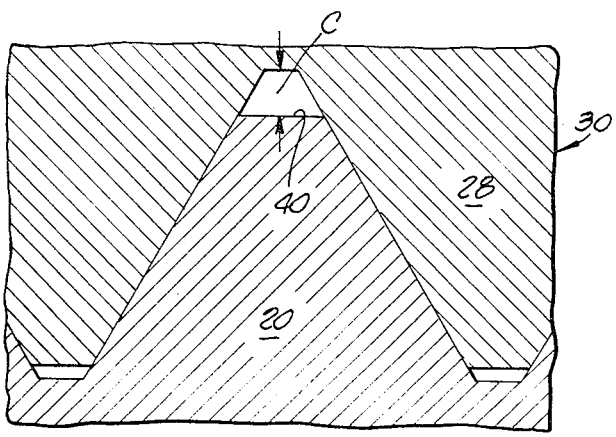
FIG. 11 is a diagrammatic view showing how the enlarged screw thread cooperates with a conventional complementary screw thread.

The cross sectional configuration of the thread formations 20 and 24 of the metal insert 16 may be understood by considering the diagrams in FIGS. 9-11. FIG. 9 shows how the screw thread 14 of the screw 12 engages the internal screw thread 28 of a complementary member 30 which, for example, may be a nut. If it is assumed that the screw thread 14 is formed by a single point turning operation whereby the crest 15 comprises an uncut portion of the cylindrical shank of the screw, a different cross sectional configuration indicated by the dotted line 32 in FIG. 10 may be provided by simply retracting the cutting tool radially outwardly of the axis of the screw by the distance that is designated $a$ in FIG. 10.

The outward shift of the cutting tool does not change the width of the bottom of the valleys formed by the turns of the screw thread and does not change the outside diameter, i.e., the diameter of the crest 15 of the screw. The retraction of the cutting tool does, however, increase the width of the screw thread at any given diameter and increases the width of the crest of the screw thread. As a consequence, the pitch diameter of the screw thread is increased. Thus, in FIG. 10 the pitch diameter of the screw thread 14 is indicated by the solid line 34 whereas the pitch diameter of the new thread configuration is indicated by the dotted line 35. It can be seen that the pitch diameter 35 is shifted towards the crest diameter and the width of the new screw thread at its pitch diameter 35 is the same as the width of the screw thread 14 at its pitch diameter 34.

Assuming that the dotted cross sectional thread configuration 32 is the cross sectional configuration of the thread formations 20 and 24 of the metal insert 16 in FIGS. 1-3, FIG. 11 shows how the new external screw thread configuration meshes with the internal screw thread 28 of the nut 30. Since the screw thread 20 is wider than the screw thread 14, the screw thread 20 meshes to lesser extend with the internal screw thread 28 and thus causes a relative radial shift, the nut 30 shifting radially if it has the greater freedom for lateral movement and the insert 16 shifting radially if it has the greater freedom for lateral movement.

In FIG. 9 the clearance between the cooperating screw threads at the crest 15 of the screw thread 14 is designated $b$ and in FIG. 11 the corresponding clearance is indicated by the letter $c$. The magnitude of the radial shift caused by the enlarged screw thread is the dimension $c$ in FIG. 10 minus the dimension $b$ in FIG. 9. The radial shift that creates the self-locking action may be controlled by controlling the dimension $a$ i.e., the magnitude of the retraction of the cutting tool.

It is important to note that the cross sectional taper of the screw thread 20 is the same as the cross sectional taper of the screw thread 14, i.e., in each instance the angle defined by the two sloping sides of the screw thread is the same. As a result, the screw thread 20 makes extensive surface-to-surface contact with the screw thread 28 in the same manner as the screw thread 14 in FIG. 9 makes extensive surface-to-surface contact with the screw thread 29.

In practically all prior art self-locking screw fasteners where an interference fit is depended upon to provide the self-locking action, extensive surface contact is sacrificed. It may also be stated that in the use of various inserts to cause a relative shift across one diameter for self-locking action between two complementary fastening members, the primary purpose of the insert is to cause the shift and the extensive metal-to-metal surface contact is created only in the region that is diametrically opposite from the insert. In effect, the function of the usual insert is to cause a brake-shoe action in the region that is diametrically opposite from the insert. In the construction shown in FIGS. 1–3 and illustrated by the diagrams in FIGS. 9–11, the insert itself provides extensive metal-to-metal surface contact with the complementary threaded member so that the insert itself functions as a second of two diametrically opposite brake shoes. Thus, in FIG. 11 which may be regarded as an enlarged fragment of FIG. 3, the metal insert 16 in causing radial shift between the two fastening members, creates self-locking brake-shoe action in the region 36 that is diametrically opposite from the insert, but the insert itself also causes self-locking braking action in its region 38. In both FIGS. 1 and 3 and again in FIG. 11 it may be seen that the crest 40 of the screw thread formation 20 of the insert 16 is substantially wider than the crest 15 of the screw thread 14.

The insert 16 may be preformed but there are advantages in machining the insert to the desired configuration after the insert is installed in the recess 18, this method of fabrication affording close control over the degree to which the insert protrudes from the recess and also simplifying the problem of registering the thread formations 20 and 24 of the insert with corresponding interrupted portions of the screw thread 14.

The pitch diameter of the enlarged screw thread 20 is sufficiently greater than the pitch diameter of the screw thread 14 to cause the desired self-locking action. It is essential, therefore, that the minimum pitch diameter of the screw thread 20 within its range of tolerance be greater than the maximum pitch diameter of the internal screw thread 28 of the nut within the range of tolerance of the internal screw thread.

Figure 5:
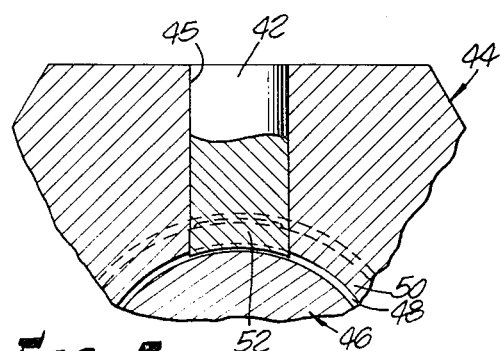
FIG. 5 is a fragmentary section taken as indicated on line 5—5 of FIG. 4.
Figure 4:
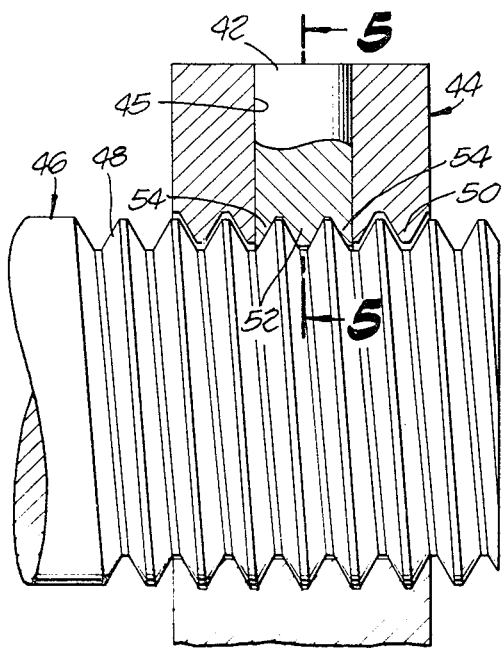
FIG. 4 is a view partly in section and partly in side elevation showing how a nut may be constructed in accordance with the invention for self-locking cooperation with a screw.

FIGS. 4 and 5 indicate how a metal insert 42 may be installed in a nut 44 to embody the invention, the insert being mounted in a recess 45 that is in the form of a radial bore in the nut. The metal insert 42 may be immobilized by forced fit or by staking or swaging or by any other suitable expedient. The nut 44 is shown threaded onto a screw 46 having a conventional screw thread 48 and the nut has an internal screw thread 50 which is also conventional. The width of the insert 42 is the width of two turns of the screw thread 48 and here again the thread formations on the insert include a central thread formation 52 and two flanking partial thread formations 54.

The same principles apply as illustrated by FIGS. 9–11, but in reverse in that the pitch diameter of the screw thread 52 is less than the pitch diameter of the insert thread 52 within its range of tolerance is less than the minimum pitch diameter of the external screw thread 48 of the screw 46 within its range of tolerance. Here again, however, the width of the crest of the screw thread is increased by the retraction of the cutting tool.

Figure 6:
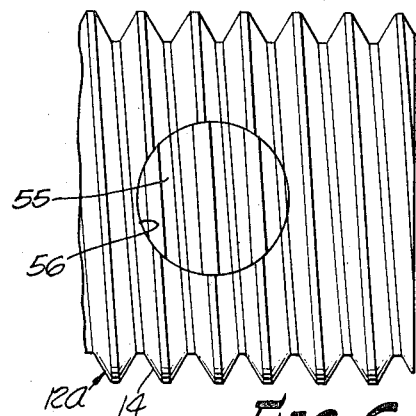
FIG. 6 is a fragmentary elevational view showing how a circular insert may be mounted in a circular peripheral recess of a screw.

FIG. 6 illustrates an embodiment of the invention in which an insert 55 is seated in a radial blind bore 56 of a screw 12a that has a conventional external screw thread 14. In this instance, the insert is wider than two turns of the screw thread 14 but the screw thread formations of the insert correspond to the screw thread formations of the insert 16 in FIGS. 1–3 to function in the same manner as the insert 16.

Figure 7:
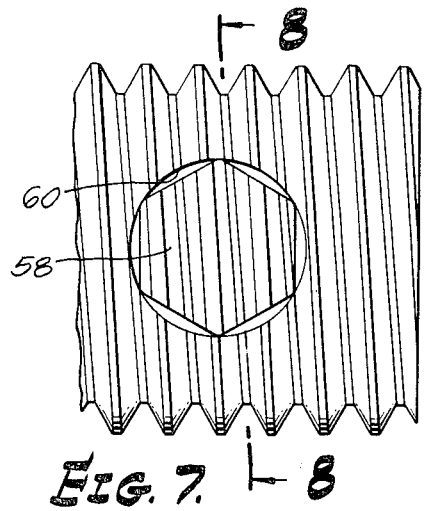
FIG. 7 is a similar view showing how a polygonal insert may be seated in the circular recess.
Figure 8:
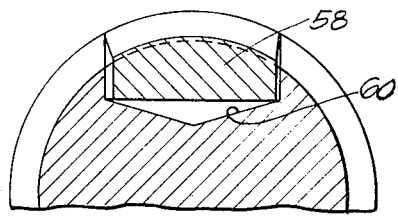
FIG. 8 is a transverse section taken as indicated by the line 8—8 of FIG. 7.

FIGS. 7 and 8 are similar to FIG. 6 but in this instance the insert 58 which is seated in a blind bore 60 is of polygonal configuration or, more specifically, hexagonal configuration. Both of the inserts 55 and 58 may be immobilized in their recesses by forced fit and in both instances the insert may be machined after it is installed.

It is apparent that in all embodiments of the invention where an insert is employed the insert serves as means to enlarge a portion of the screw thread of the fastener in which the insert is mounted. As heretofore noted, however, the screw thread may be locally enlarged without employing an insert. Thus, it is apparent from a consideration of FIG. 10 that an embodiment of the invention may be produced by manipulating a tool that is employed for single point turning for the screw thread 14, it merely being necessary to retract the cutting tool slightly in the region where the screw thread enlargement is desired.

According to a further important feature of the present invention, the insert 16 is formed of a material having a coefficient of thermal expansion and contraction that is the same as or greater than that of the material used for the screw fastener in which the insert is mounted. This results in increased locking action at relatively high operating temperatures.

As exemplary of the foregoing feature of the present invention, improved operations at relatively high temperatures have been obtained with a test combination of fastener components and insert having the following specifications:

a. Bolt material — INCONEL 718
   Expansion rate — Approximately 0.000006 in./F.°
b. Nut material — A 286 Stainless Steel.
   Expansion rate — Approximately 0.000006 in./F.°
C. Insert material — Aluminum bronze composition
   obtainable under the trade name "Ampco Grade 18"
   Hardness — Rockwell 94 to 95 B scale.
   Expansion rate — 0.000009 in./F.°

Room Temperature Tests (70°–80° F.)

Torque tests on above conducted in accordance with MIL–F–18240 B & C specifications, which requires 15 cycles of fastener in mating test block, repeatedly indicated 35 cycles, while some of the test specimens indicated 75 cycles and are still good.

High Temperature Tests

Tests were conducted on the above noted specimens at 750° F., 1000° F., 1100° F., 1150° F., and 1200° F.

Tests indicated that the test specimens will, on an average, survive eight to 10 cycles at these high temperatures as compared to two to three cycles at 1150° F. of a certain other known so-called "high temperature bolt" design.

The above noted specimens in "brake-away" torque tests indicated:

Room temperature — 43 inch pounds in five trials.
After 1150° F. temperature — 288 inch pounds.

My description in specific detail of the selected embodiments of the invention will suggest various changes, substitutions, and other departures from my disclosure within the spirit and scope of the invention.

I claim:

1. In a metal fastener having a screw thread to engage a complementary screw thread of a complementary member,
   the improvement for locking action with the complementary member, comprising:
   the turns of a portion of the screw thread of the fastener in a region of substantially less than 180° circumferential extent being of metal and having an enlarged cross sectional configuration, a wider crest, and substantially the same crest diameter as the remainder of the screw thread and having a different pitch diameter than the pitch diameter of the remainder of the screw thread,
   whereby said portion of the screw thread meshes with the complementary screw thread to lesser degree than the remainder of the screw thread to cause relative lateral displacement of the fastener and the complementary member for binding action between the fastener and the complementary member,
   the lead of the screw thread being constant or without change in phase throughout both said region of the turns of the screw thread and the remainder of the turns of the screw thread,
   whereby the centers of the crests of the screw thread are uniformly spaced throughout the length of the screw thread.

2. An improvement as set forth in claim 1 in which in comparison with the remainder of the screw thread, the pitch diameter of said portion of the screw thread is shifted towards the diameter of the crest of the remainder of the screw thread.

3. An improvement as set forth in claim 1 in which the angle between the sloping sides of said portion is the same as the angle between the sloping sides of the remainder of the screw thread for extensive surface-to-surface contact between said portion and said complementary screw thread to cause said portion to act as a brake shoe to resist relative rotation of the fastener.

4. An improvement as set forth in claim 1 in which a recess interrupts the screw thread and a metal insert seated in the recess provides said portion of the screw thread for the locking action.

5. An improvement as set forth in claim 4, wherein the insert is of a material having a coefficient of expansion which is substantially the same as that of the material of the fastener at relatively high operating temperatures.

6. An improvement as set forth in claim 4, wherein the coefficient of expansion of the insert is greater than that of the material of the fastener.

7. An improvement as set forth in claim 4 in which the fastener is made of a stainless metal and the insert is made of an aluminum bronze composition.

* * * * *

UNITED STATES PATENT OFFICE
CERTIFICATE OF CORRECTION

Patent No. 3,687,183          Dated August 29, 1972

Inventor(s) Robert F. Rohm

It is certified that error appears in the above-identified patent and that said Letters Patent are hereby corrected as shown below:

In column 3, in the description of Fig. 10, delete the repetitive phrase "compares in cross sectional configuration with that of a screw thread" following "thread" in line 3 thereof.

In column 5, line 9, change "29" to --28--.

In column 6, line 3, after the second occurrence of "the" insert --screw thread 50 of the nut and the maximum pitch diameter of the--.

Signed and sealed this 30th day of January 1973.

(SEAL)
Attest:

EDWARD M. FLETCHER, JR.
Attesting Officer

ROBERT GOTTSCHALK
Commissioner of Patents